United States Patent [19]
Fukuda et al.

[11] Patent Number: 6,163,318
[45] Date of Patent: *Dec. 19, 2000

[54] WINDOW DISPLAYING SYSTEM WITH DISPLAYING OF SET OF WINDOW GRAPHS SHOWING OVERLAPPING STATE OF WINDOWS

[75] Inventors: Ryoji Fukuda; Takashi Harada, both of Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/524,413

[22] Filed: Sep. 6, 1995

[30] Foreign Application Priority Data

Sep. 8, 1994 [JP] Japan .................... 6-240656

[51] Int. Cl.$^7$ ........................................ G06F 3/14
[52] U.S. Cl. .......................................... 345/344
[58] Field of Search .................. 395/344, 340, 395/341, 342, 343, 345, 339, 348; 345/119, 120, 344, 340, 341, 342, 343, 345, 339, 348

[56] References Cited

U.S. PATENT DOCUMENTS

| | | | |
|---|---|---|---|
| 4,831,556 | 5/1989 | Oono ........................... | 345/341 |
| 5,095,448 | 3/1992 | Obuchi et al. ............ | 345/973 X |
| 5,129,057 | 7/1992 | Strope et al. ............. | 345/348 |
| 5,339,391 | 8/1994 | Wroblewski et al. ....... | 345/341 |
| 5,412,775 | 5/1995 | Maeda et al. .............. | 345/345 |
| 5,479,600 | 12/1995 | Wroblewski et al. ...... | 345/340 |
| 5,497,454 | 3/1996 | Bates et al. ............... | 345/344 |
| 5,550,969 | 8/1996 | Torres et al. .............. | 345/348 |
| 5,892,511 | 4/1999 | Gelsinger et al .......... | 345/340 |

FOREIGN PATENT DOCUMENTS

| | | |
|---|---|---|
| 2301821 | 12/1990 | Japan . |
| 5080965 | 4/1993 | Japan . |
| 05173743 | 7/1993 | Japan . |
| 5204581 | 8/1993 | Japan . |
| 6-67835 | 3/1994 | Japan . |

OTHER PUBLICATIONS

"Graphical Window List System", Research Disclosure, No. 348, p. 270 (Apr. 1, 1993).

"User–Friendly Graphical Interface for Window Management Using Frames", IBM Technical Disclosure Bulletin, vol. 37, No. 5, pp. 235–238 (May 1994).

"Intuitive Desktop Including Navigation Through a Complex Graphical Structure", IBM Technical Disclosure Bulletin, vol. 33, No. 11, pp. 78–81, (Apr. 1, 1991).

Translation of Japanese Patent Document No. 6–67835, Mar. 1994.

*Primary Examiner*—Matthew M. Kim
*Assistant Examiner*—Crescelle N. dela Torre
*Attorney, Agent, or Firm*—Fitzpatrick, Cella, Harper & Scinto

[57] ABSTRACT

A window system is constructed by a checking section to check an overlapping state of a plurality of windows displayed on a display, a forming section to form window graphs each showing the positional relation of each window when the windows are seen from another direction such as vertical or horizontal direction different from the overlapping direction and each corresponding to each window, a display such as a color CRT or LCD display to display the window graphs, a detector to detect an overlapped portion of the window graphs from the window graphs formed, and a changing section to change an attribute of the window graph to clarify the overlapped portion of the window graphs when such a portion is detected. By performing a selecting or operating instruction by a mouse cursor or the like to a desired window graph, the window corresponding to the instructed window graph can be selected or operated.

43 Claims, 9 Drawing Sheets

| WINDOW | DEPTH | X1 | Y1 | X1 | Y2 |
|---|---|---|---|---|---|
| W1 | 2 | 35 | 40 | 48 | 54 |
| W2 | 1 | 20 | 20 | 40 | 40 |
| W3 | 3 | 54 | 23 | 86 | 35 |
| W4 | 1 | 45 | 38 | 73 | 98 |
| ⋮ | ⋮ | ⋮ | ⋮ | ⋮ | ⋮ |

WINDOW DISPLAYING SYSTEM WITH DISPLAYING OF SET OF WINDOW GRAPHS SHOWING OVERLAPPING STATE OF WINDOWS

BACKGROUND OF THE INVENTION

1. Field of the Invention

The invention relates to a window system which can display a plurality of windows to display means and which can execute a different operation processing for every window.

2. Related Background Art

In a conventional window system, in the case where a plurality of windows are displayed, since an overlapping of the windows is permitted, there is a situation such that the other windows are perfectly hidden in dependence on a display position and a size of the window. In the case where there are such a plurality of windows, since it is difficult to grasp the positional relation among the windows, in order to search the hidden window, the user repeats operations such as to move the window displayed in the highest order to the lowest order or to change the window of the highest order to an icon, thereby enabling the lower order windows to be seen, or the like.

As a method of grasping the positions of the windows, the following method has been realized.

First, there is a technique such as "Computer apparatus having a function to display a plurality of windows" disclosed in Japanese Patent Application Laid-open No. 5-173743. According to such a technique, when there are overlapped windows, a mode is switched from an overlapping mode to a transparent mode and all of the hidden windows which cannot be seen are allowed to be seen, thereby enabling the position of the target window to be easily known.

In an X window system (registered trade name of X consortium), there is a tvtwm window manager to provide a virtual desk-top environment. According to such a window manager, a diagram reduced as a whole is displayed so as to know an arrangement of the windows displayed on a display and an operation is instructed for such a diagram, thereby realizing the movement of the actual window. Namely, in order to grasp the overlapping state of the windows, it is necessary to repeat the operations such as movement of the window, change to the icon, and the like.

Further, there is a layer display and operating function of MacDraw (registered trade name of Apple Computer Co. Ltd. in U.S.A.). Although such a function relates to an application software for forming a document instead of a window system, an overlapping state of pages (called layers) such that an image of a lower document can be transmitted and seen even when they are overlapped can be confirmed and operated by a menu. This shows that a technique such that the overlapping state can be grasped by a menu format although a relation with the window system is low exists as prior art. Different from the window, since the sizes of layers are fixed, the overlapping state can be grasped and operated by the menu format. However, a plane-like operation that is peculiar to the window such as movement of position or change in size cannot be realized by the menu format.

In the above conventional window system, means for easily grasping the overlapping state of the windows having a planar extent doesn't exist and means for enabling an operation to move the overlapped hidden window or to change a size of such a window to be directly executed doesn't exist.

Specifically speaking, the foregoing "Computer apparatus having a function to display a plurality of windows" has a drawback such that in the case where overlapped windows are displayed as a transparent mode, since all of the figures on the windows are seen all together, there is a case where it is impossible to judge which figure corresponds to which window and it is difficult to know the position of a target window. Particularly, when the number of overlapped windows exceeds three, it is practically difficult to grasp the overlapping state of the windows from the transparent mode, so that it eventually takes troublesomeness and time to grasp such an overlapping state.

Since the windows of the figures displayed on the virtual desk-top window are displayed like a plane in the above tvtwm window manager, there is a drawback such that it is difficult to grasp the overlapping state of the lower window.

Further, the layer display and operating function of the MacDraw mentioned above has a drawback such that the overlapping state of the layers is changed in only the vertical direction and the layers cannot be moved in the vertical and horizontal directions and a resizing (change in size of the window) operation that is peculiar to the window system cannot be performed.

SUMMARY OF THE INVENTION

The invention is made in consideration of the above problems and it is an object of the invention to provide a window system which can improve a working efficiency of a window process for overlapped windows.

To accomplish the above object, the invention has: checking means for checking an overlapping state of a plurality of windows; forming means for forming window graphs each showing a positional relation of each window when the windows are seen from another direction different from an overlapping direction; and display means for displaying the window graphs formed.

Preferably speaking, the invention has: detecting means for detecting the overlapped portion of the windows from the window graphs formed; and changing means for changing attributes of the window graphs in order to clarify the overlapped portion when the overlapped portion of the window graphs is detected by the detecting means.

Further preferably speaking, the changing means clarifies the overlapped portion of the window graphs by at least one of the shape, color, flickering, texture, thickness, and shadow.

The invention has: checking means for checking an overlapping state of a plurality of windows; forming means for forming window graphs each showing a positional relation of each window when the windows are seen from another direction different from an overlapping direction; display means for displaying the window graphs formed; input means for performing a selecting instruction or an operating instruction to the window; and control means for performing the selecting instruction or operating instruction to the window when the selecting instruction or operating instruction by the input means is executed for the window graphs displayed.

Preferably speaking, the operating instruction is an instruction to move the window in the vertical or horizontal direction, an instruction to change the overlapping state of the windows, an instruction to change the sizes of the windows, or an instruction to erase the windows.

Further preferably speaking, the selecting instruction is generated for all of the window graphs.

DETAILED DESCRIPTION OF THE PREFERRED EMBODIMENTS

Embodiments of the invention will now be described in detail hereinbelow with reference to the drawings.

Figure 1:
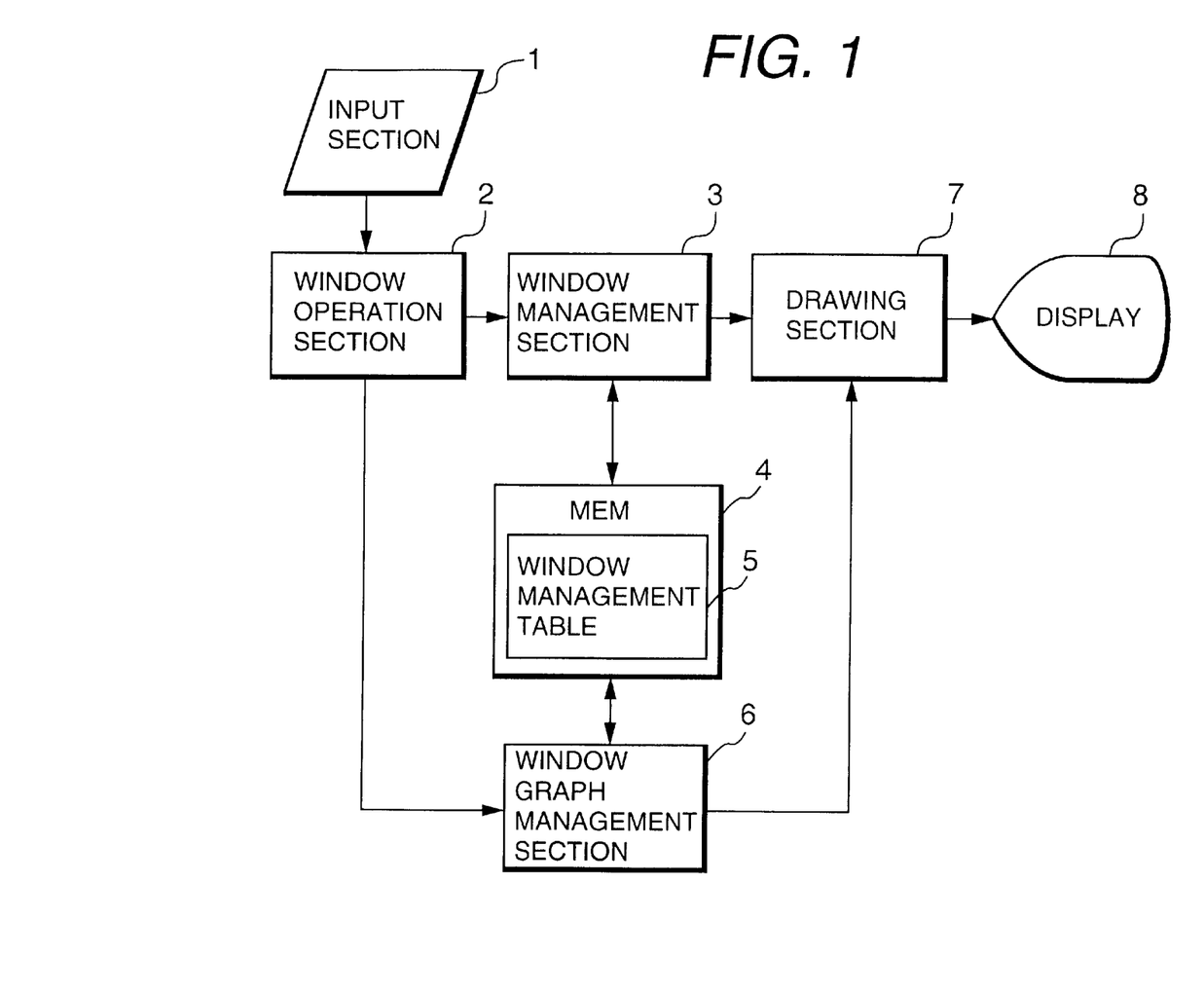
FIG. 1 is a block diagram showing a schematic construction of a window system according to the first embodiment of the invention.

FIG. 1 is a block diagram showing a schematic construction of a window system according to the first embodiment of the invention. To grasp an overlapping state of windows, window graphs are displayed in the embodiment.

In the diagram, the window system of the embodiment is constructed by: an input section 1 to input various information; a window operation section 2 to perform an operation to a desired window in accordance with an input by the input section 1; a window management section 3 to manage the windows in accordance with the operation by the window operation section 2; a memory 4 to store the inputted various information, a state of each window, and the like; a window management table 5 to manage each window held in a predetermined area in the memory 4; a window graph management section 6 to form window graphs on the basis of the data in the window management table 5; a drawing section 7 to display the windows and window graphs in accordance with outputs from the window graph management section 6 and window management section 3; and a display 8 to display an output from the drawing section 7.

In the embodiment, a CRT display device is used as a display 8. A main memory is used as a memory 4. The window operation section 2, window management section 3, window graph management section 6, and drawing section 7 are realized by executing a control program stored in the main memory by a central processing unit (CPU).

Figure 2:
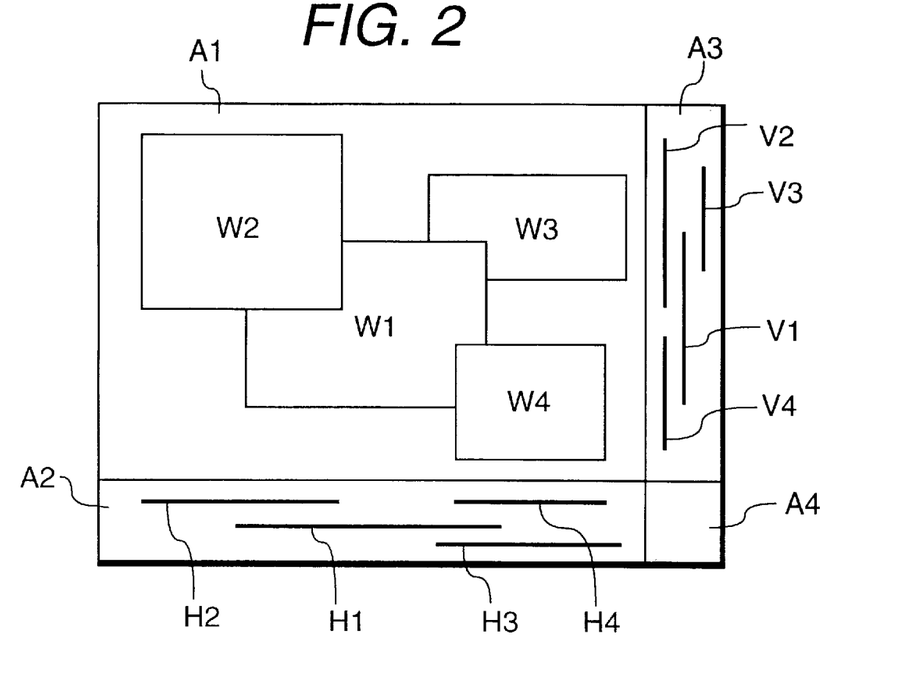
FIG. 2 is a diagram showing an example of windows displayed by display means in FIG. 1.

FIG. 2 is a diagram showing an example of the windows displayed in the display 8.

In the diagram, W1 to W4 denote windows; V1 to V4 indicate diagrams (vertical window graphs) when the windows W1 to W4 are seen from the horizontal direction; H1 to H4 likewise diagrams (horizontal window graphs) when the windows W1 to W4 are seen from the vertical direction; A1 a main window display area; A2 a horizontal window graph display area; A3 a vertical window graph display area; and A4 a function area.

A control operation which is executed by the window system constructed as mentioned above will now be described hereinbelow with reference to FIGS. 3 to 6.

Since an essence of the invention relates to the management, display, and operation of windows in the window system, only the essence of the invention will be explained in detail in the embodiment and the other portions are properly omitted for convenience of explanation. Therefore, since the whole window system is not explained in detail, it is assumed that the well-known processings to those skilled in the art are tacitly executed unless otherwise described.

Figure 3:
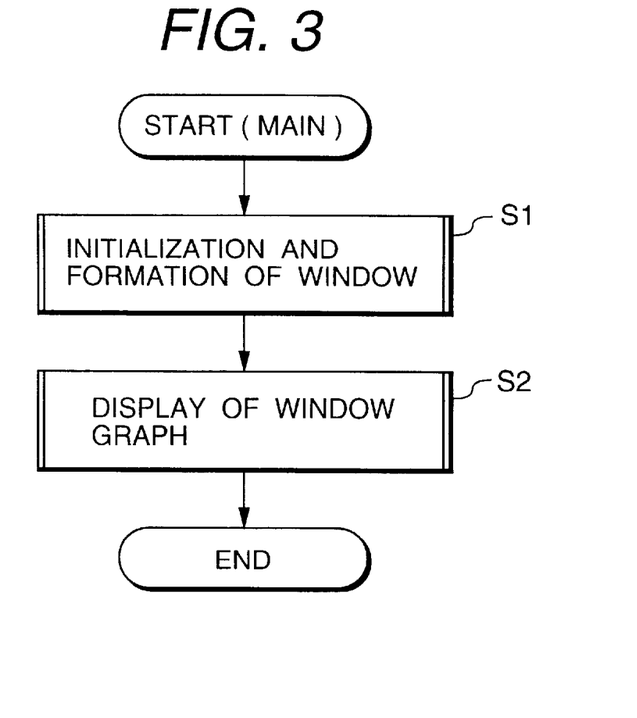
FIG. 3 is a flowchart showing a procedure of a main routine for display that is executed by the window system in the first embodiment.

FIG. 3 is a flowchart showing a procedure of a main routine for a display that is executed by the window system of the embodiment.

In the diagram, a subroutine for initialization and forming process of windows, which will be explained hereinlater, is first executed (step S1). A subroutine for a window graph display processing for displaying an overlapping state of the windows, which will be explained hereinlater, is executed (step S2). After that, the main routine is finished.

Figure 4:
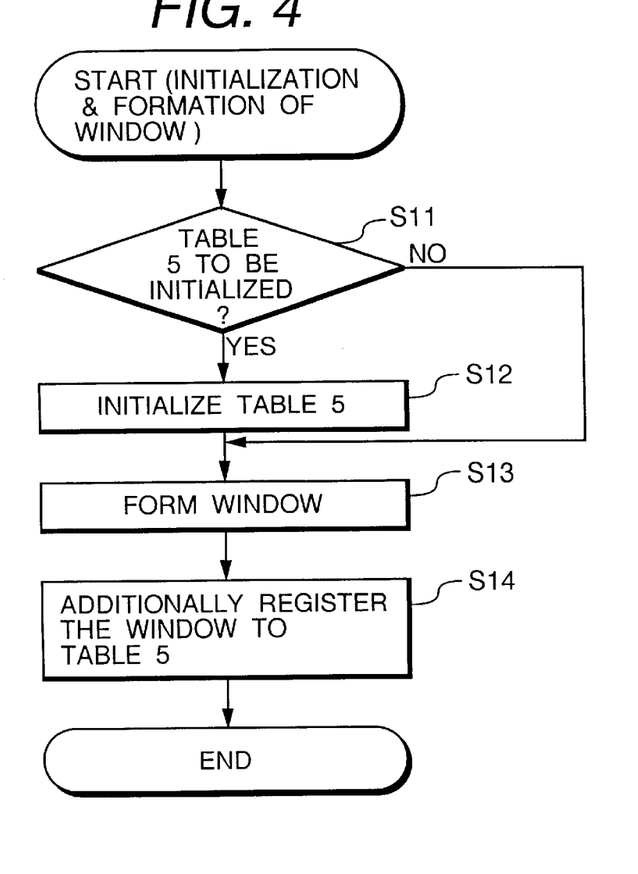
FIG. 4 is a flowchart showing a detailed procedure of a subroutine for an initialization and formation processing of windows in step S1 in FIG. 1.
Figure 5:
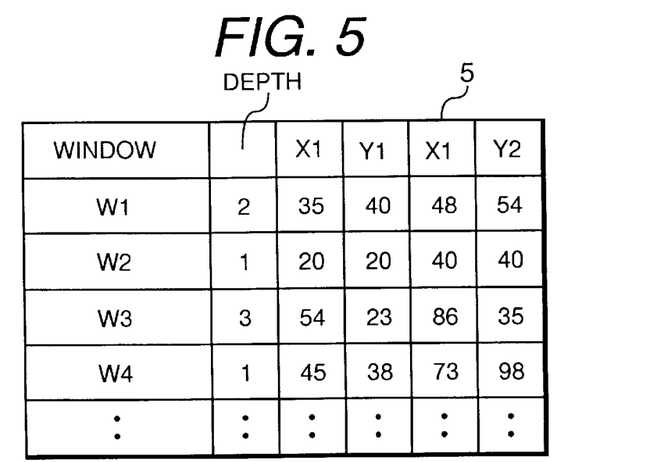
FIG. 5 is a diagram showing an example of a window management table in FIG. 1.

FIG. 4 is a flowchart showing a detailed procedure of a subroutine for initialization and forming process of windows in step S1. FIG. 5 shows an example of a window management table that is formed at the time of formation of windows and corresponds to that (component element 5) described in FIG. 1 mentioned above.

In FIG. 4, first, a check is made to see if the window management table 5 is initialized or a new window is additionally formed in the window management table 5 or not (step S11). In case of an activation of the window system or the like, the window management table 5 is initialized (step S12).

Subsequently in step S13, a window is formed. However, in order to form the window management table 5 by a format shown in FIG. 5, a processing to read out coordinates (X1, Y1) of a left upper position and coordinates (X2, Y2) of a right lower position of the window formed is also executed. A depth of the window which was newly formed is set to "1" unless otherwise specified and is registered into the window management table 5. An overlapping state of the newly formed window and the other existing windows is examined by comparing the coordinates (X1, Y1, X2, Y2). When there is an overlapped portion, the depth of the overlapped window is increased by only "1". Further, when there is another window under such an overlapped window, the depth of such a lower window is similarly increased by "1". An updating of the depth is similarly repeated until there is no window under the overlapped window. In step S14, the newly formed window is stored into the memory 4 in a form of the additional registration into the window management table 5.

Figure 6:
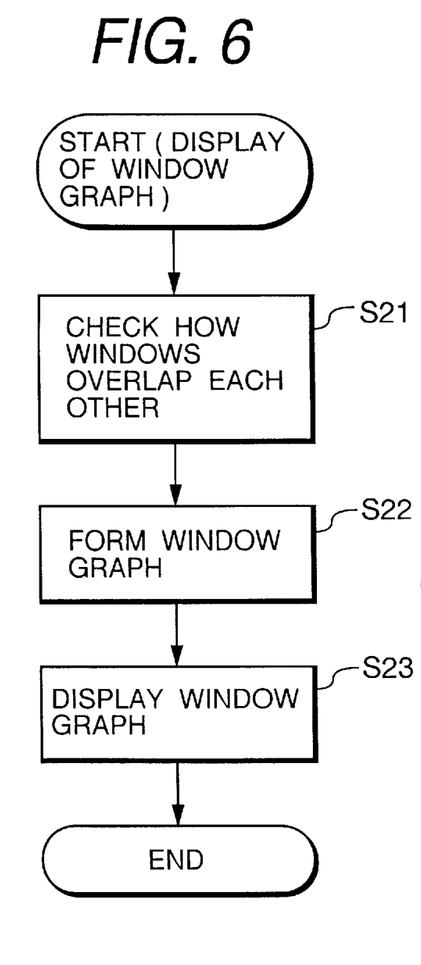
FIG. 6 is a flowchart showing a detailed procedure of a subroutine for display of window graphs in step S2 in FIG. 3.

FIG. 6 is a flowchart showing a detailed procedure of the subroutine for displaying window graphs in step S2.

In the diagram, an overlapping state of the windows is first checked (step S21). As mentioned above, since the overlapping state of the windows is managed by the "depth" in the window management table 5 (FIG. 5) that is formed at the time of formation of the windows, the processing in step S21 is executed by specifically examining the "depth".

Subsequently, window graphs as diagrams when the windows are seen from another direction different from the overlapping direction of the windows are formed (step S22). Specifically speaking, on the basis of the information (depth, X1, Y1, X2, Y2) of the windows examined in step S21 mentioned above, the window graphs when the windows are seen from another direction different from the overlapping direction are formed from the sizes in the horizontal and vertical directions and from the upper/lower relations.

Further, the window graphs formed are displayed to the display 8 (step S23). In step S23, an image formed in step S22 is displayed on the CRT display as a display 8.

As described above, according to the embodiment, as shown in FIG. 2, the window graphs V1 to V4 and H1 to H4 are displayed from the plurality of windows W1 to W4 displayed, and the overlapping state of the windows can be easily grasped.

In the embodiment, although the CRT display device has been used as a display 8, a liquid crystal display device can be also used.

Even if the lower hidden window can be grasped, a case where the kind of such a window cannot be known is also considered. In this case, window names are added upon formation of the window graphs and the window graphs can be also displayed.

A window system according to the second embodiment of the invention will now be described.

The second embodiment differs from the foregoing first embodiment with respect to only a point that the window graphs are displayed in colors, thereby enabling the overlapping state or the like to be easily seen. A system similar to that (FIG. 1) of the first embodiment is used except that a color CRT display is used as a display 8.

As a control operation which is executed by the window system of the embodiment, a control operation similar to that of the main routine for display (FIG. 4) described in the first embodiment is used. Such a control operation can be realized by changing the window graph display subroutine of the main routine to a subroutine of FIG. 7. Therefore, in steps in FIG. 7, processing steps similar to those in FIG. 6 are designated by the same step numbers and their descriptions are omitted.

Figure 7:
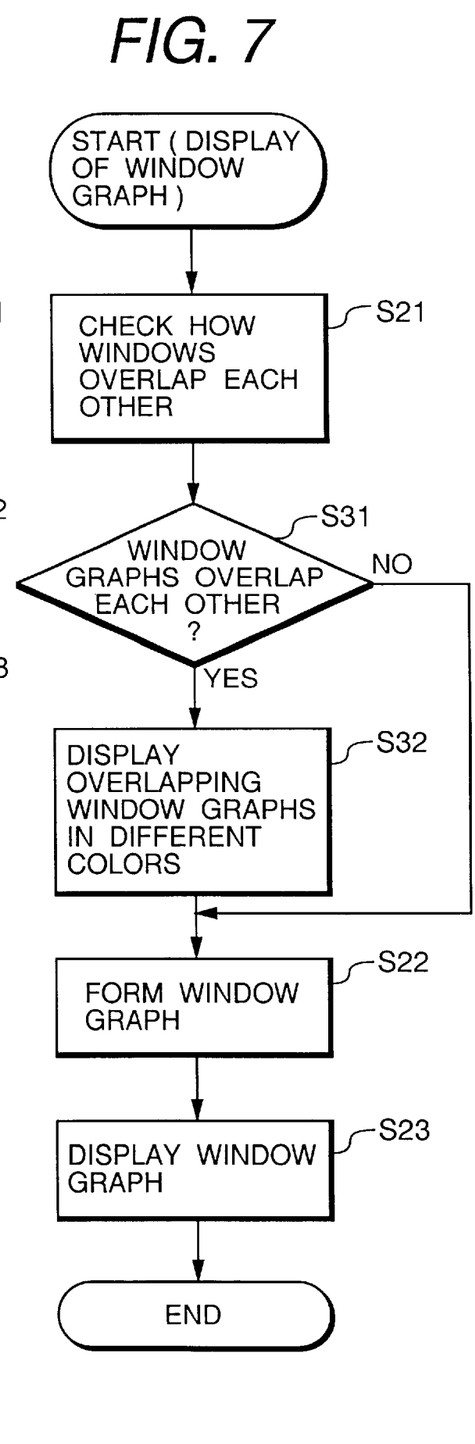
FIG. 7 is a flowchart showing a detailed procedure of a subroutine for display of window graphs according to the second embodiment.

FIG. 7 is a flowchart showing a detailed procedure of the window graph display subroutine of the embodiment. As processes in the case where the window graphs are overlapped, steps S31 and S32 are added between steps S21 and S22 in the flowchart of FIG. 6.

In step S31, whether a window graph to be formed overlaps the window graphs formed so far or not is judged by comparing the "depth" and the "X coordinate" or the "depth" and the "Y coordinate" in the window management table 5. Thus, when they overlap, the processing routine advances to step S32. When they don't overlap, the processing routine skips step S32 and advances to step S22. In step S32, a fact that the new window graph overlaps the other window graphs is emphasized by using another color different from the colors of the window graphs existing so far.

Figure 8:
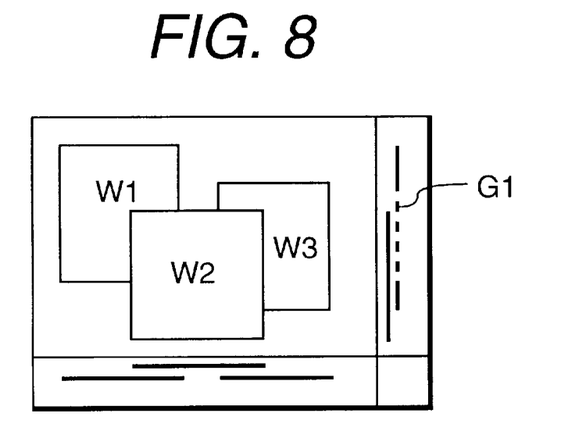
FIG. 8 is a diagram showing an example of windows and window graphs displayed by a window system of the second embodiment.

FIG. 8 is a diagram showing an example of the windows and window graphs displayed by the window system of the embodiment. This diagram shows an example in the case where three windows W1, W2, and W3 having overlapped portions are shown together with the window graphs. G1 denotes a graph showing the overlapped portion when the windows W1 and W3 are seen from the horizontal lateral direction.

In the embodiment, in the case where the colors of the windows formed so far are blue, the color of the overlapped portion G1 is set to red.

In the case where the colors of the window graphs existing so far are blue and the color of the window graph to be formed from now on is red and it overlaps the existing window graphs, by setting the color of the overlapped portion G1 to purple as a mixture color of blue and red, the overlapping state can be further visually easily grasped.

According to the second embodiment as described above, by using a color CRT display as a display 8 and adding the processing steps of changing the display color of the overlapped portion of the windows to the first embodiment, a confusion (complication) which occurs when grasping the overlapping state of the windows can be prevented.

A similar effect is also derived by using a color liquid crystal display as a display 8.

Even in the non-overlapped portions of the windows, common colors can be also allocated to the frames of the windows and the window graphs in order to distinguish each window.

Further, even when each window is distinguished by changing a shape, a flickering, a texture, a thickness, a shadow, or the like as an attribute other than the color or by properly combining those attributes, a similar effect is obtained.

A window system according to the third embodiment of the invention will now be described.

The embodiment relates to the operation of the window and has a construction similar to that of the second embodiment except that a mouse is used as an input section 1.

Figure 9:
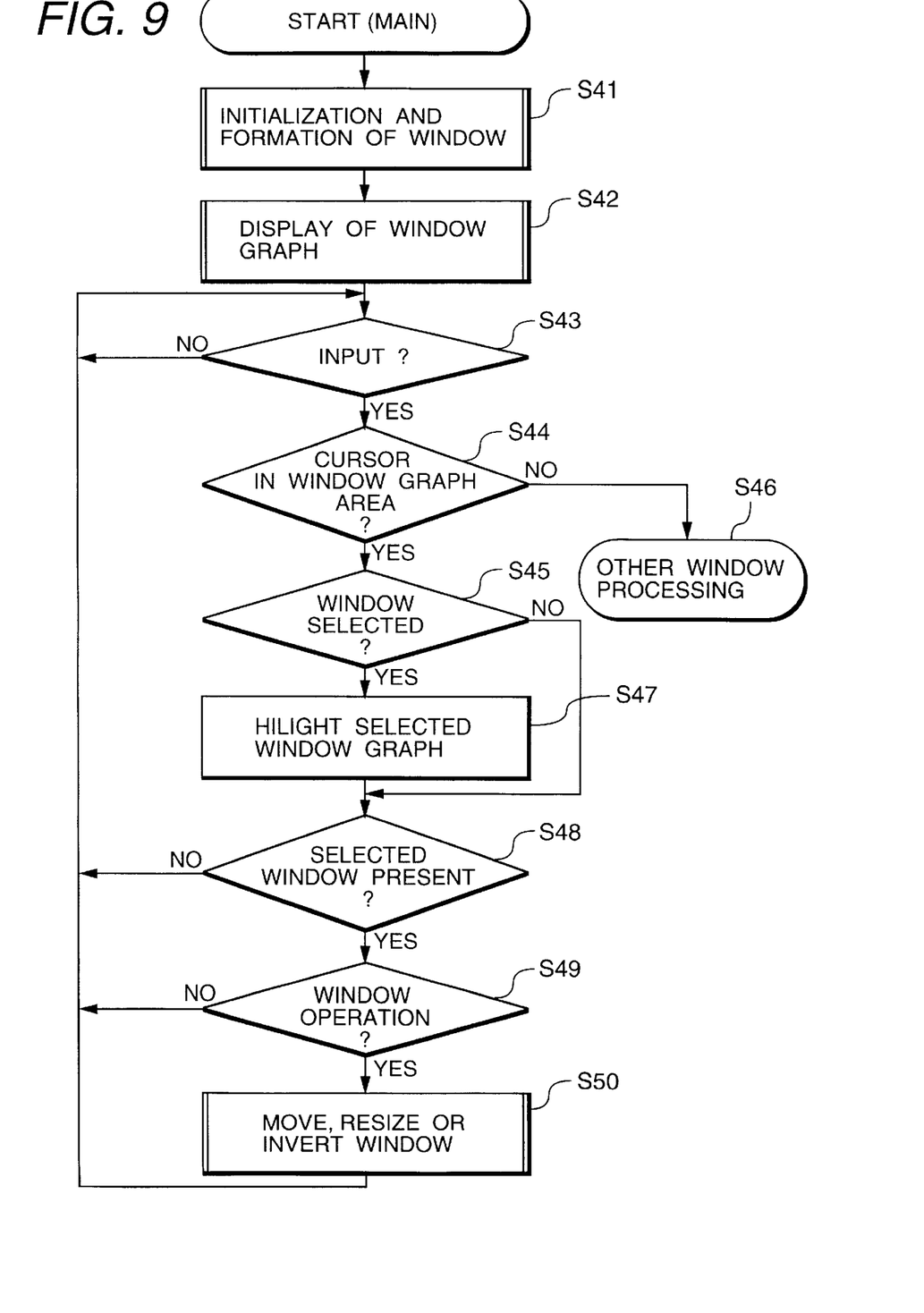
FIG. 9 is a flowchart showing a procedure for a main routine which is executed by a window system according to the third embodiment.

FIG. 9 is a flowchart showing a procedure of a main routine which is executed by the window system of the embodiment.

First in step S41, a subroutine for initialization and forming process of windows is executed. In step S42, a subroutine for a window graph display processing is executed. The subroutine in steps S41 and S42 executes processes similar to those of the subroutine in steps S1 and S2 (FIG. 3) described in the first embodiment, respectively.

Subsequently in step S43, the system waits for an input from the mouse as an input section 1. When there is an input, the processing routine advances to step S44. When there is no input, the processing routine is returned to step S43 and the system waits until there is an input. In the specification, "input" denotes a click of a mouse button instead of the movement of a mouse cursor and since the movement processing of the mouse cursor is not an essence of the embodiment, its description is omitted here.

Figure 12:
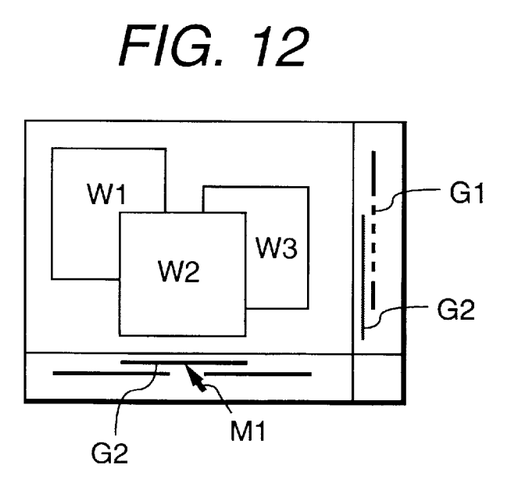
FIG. 12 is a diagram showing the case where a mouse cursor M1 is moved onto a graph G2 corresponding to a window W2 and a mouse button is clicked at that location.

In step S44, a check is made to see if the mouse cursor exists in the window graph area A2 or A3 or not. When the mouse cursor exists in the window graph area A2 or A3, step S45 follows. When it doesn't exist in the window graph areas A2 and A3, step S46 follows. Since step S46 relates to other window processing that is executed by the window system and is not an essence of the embodiment, a description of such a processing is omitted here. The window graph is unconditionally coupled to the corresponding window. The selection of the window graph directly denotes the selection of the window. FIG. 12 is a diagram showing the case where a mouse cursor M1 is moved onto a graph G2 corresponding to the window W2 and the mouse button is clicked at this position.

In step S45, whether the system is in a state in which the window is selected or not is discriminated by checking on which window graph the position of the mouse cursor M1 exists. When the mouse cursor M1 exists on the window graph, step S47 follows. When the mouse cursor doesn't exist on the window graph, the processing routine skips step S47 and advances to step S48. When the mouse cursor M1 exists on the window graph area, the window corresponding to the window graph is selected in step S47, thereby changing the display of the selected window graph (window graph G2 in FIG. 12).

Figure 13:
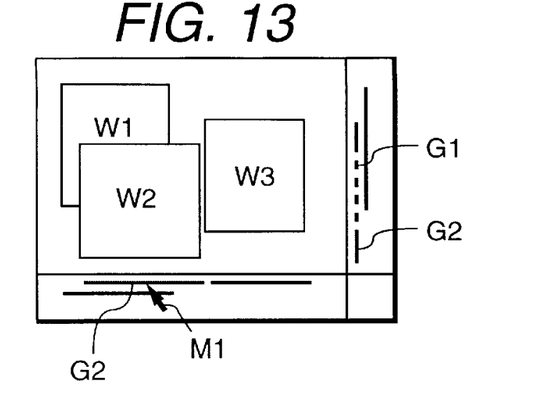
FIG. 13 is a diagram showing an execution result in the case where the window graph G2 in FIG. 12 is moved to the left.

The presence or absence of the window selected is judged in step S48. When there is no selected window, the processing routine is again returned to step S43. When there is the selected window, step S49 follows. In step S49, a check is made to see if the operation of the window is executed or not. If YES, step S50 follows. If NO, the processing routine is returned to step S43. The operation of the window here denotes the moving operation of the window in the vertical and lateral direction, like an operation such that when the mouse cursor is moved to the left with the mouse button depressed, the mouse cursor is moved to the left of the selected window. FIG. 13 shows an execution result in the case where the window graph G2 in FIG. 12 is moved to the left.

Figure 14:
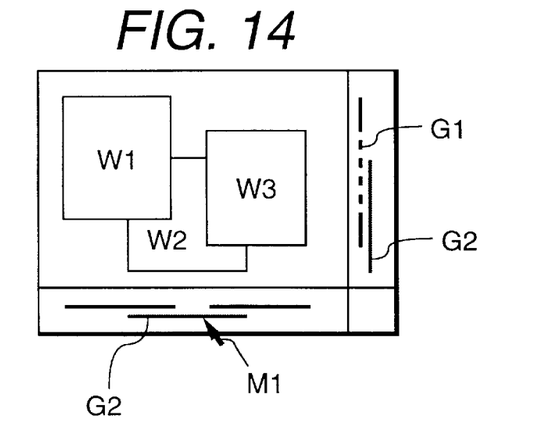
FIG. 14 is a diagram showing an execution result in the case where the window graph G2 in FIG. 12 is moved in the depth direction.

In the case where the mouse button is moved in the depth direction (lower direction in case of the horizontal window graph, right direction in case of the vertical window graph) with the button depressed, the operation of the window denotes the moving operation to move the selected window in the depth direction. FIG. 14 shows an execution result in the case where the window graph G2 in FIG. 12 is moved in the depth direction.

Figure 15:
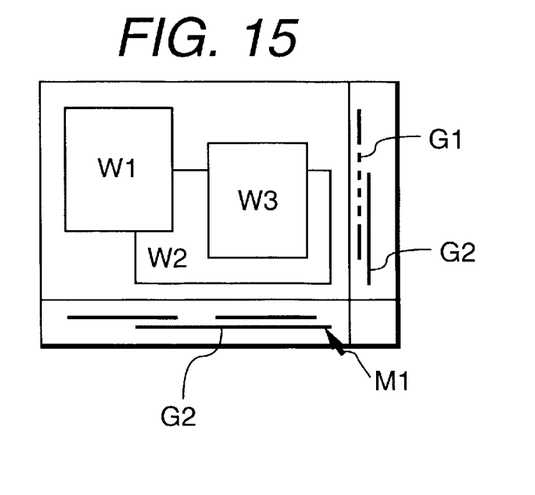
FIG. 15 is a diagram showing a state in the case where an operation to extend the right edge of the window graph G2 in FIG. 14 to the right by the mouse cursor M1 is executed.

In the case where the mouse cursor is located at an end point of the window graph and is moved with the mouse button depressed, its operation means a changing operation (resize) of a size of window. FIG. 15 is a diagram in the case where the operation to extend the right edge of the window graph G2 in FIG. 14 to the right by the mouse cursor M1.

Figure 10:
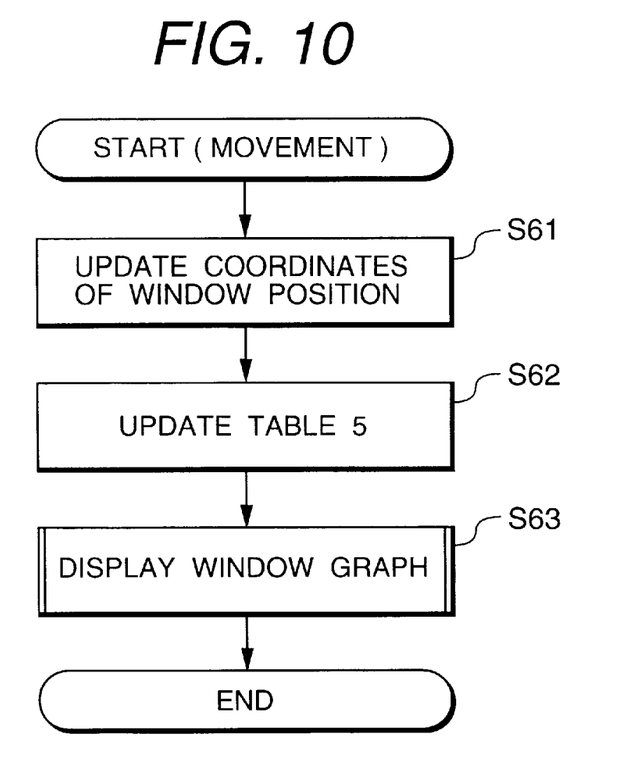
FIG. 10 is a flowchart showing a detailed procedure of a subroutine for a movement processing of windows in step S50 in FIG. 9.

FIG. 10 is a flowchart showing a detailed procedure of a subroutine for a movement processing of the window in step S50.

In the diagram, first in step S61, the coordinates of the window position are updated. In step S62, the window management table 5 is updated. In step S63, the window graph is displayed.

Figure 11:
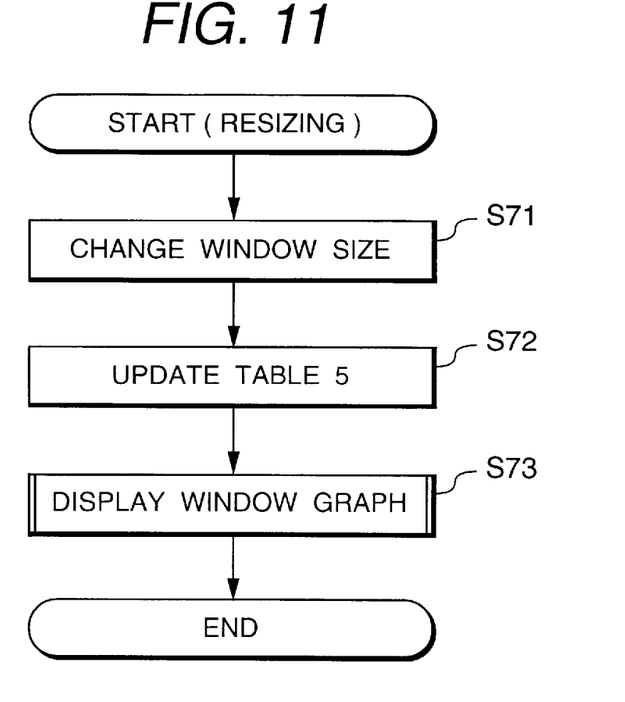
FIG. 11 is a flowchart showing a detailed procedure for a resizing subroutine of a window in step S50 in FIG. 9.

FIG. 11 is a flowchart showing a detailed procedure of a resizing subroutine of the window in step S50.

In the diagram, a size of the window is changed in step S71. In association with the size change, the window management table 5 is updated in step S72 and the window graph is displayed in step S73 after that in a manner similar to steps S62 and S63 in FIG. 10.

According to the embodiment as described above, by executing the selection processing or operation processing to a desired window graph, the selection processing or operation processing can be executed for the relevant window, so that an operating efficiency can be further improved.

In the embodiment, although the mouse has been used as an input section 1, a similar effect is derived by using another pointing device (for example, a pen, a touch panel, or the like).

The erasure of windows can be also realized in a manner similar to the foregoing embodiment. Further, a menu is displayed after the window graph was selected, and by selecting and instructing "movement", "resize", "erase", or the like in the menu, a similar effect is obtained.

A window system according to the fourth embodiment of the invention will now be described.

The embodiment relates to a case where the depths of windows are arranged in the reverse order and uses substantially the same construction as that of the third embodiment.

Figure 16:
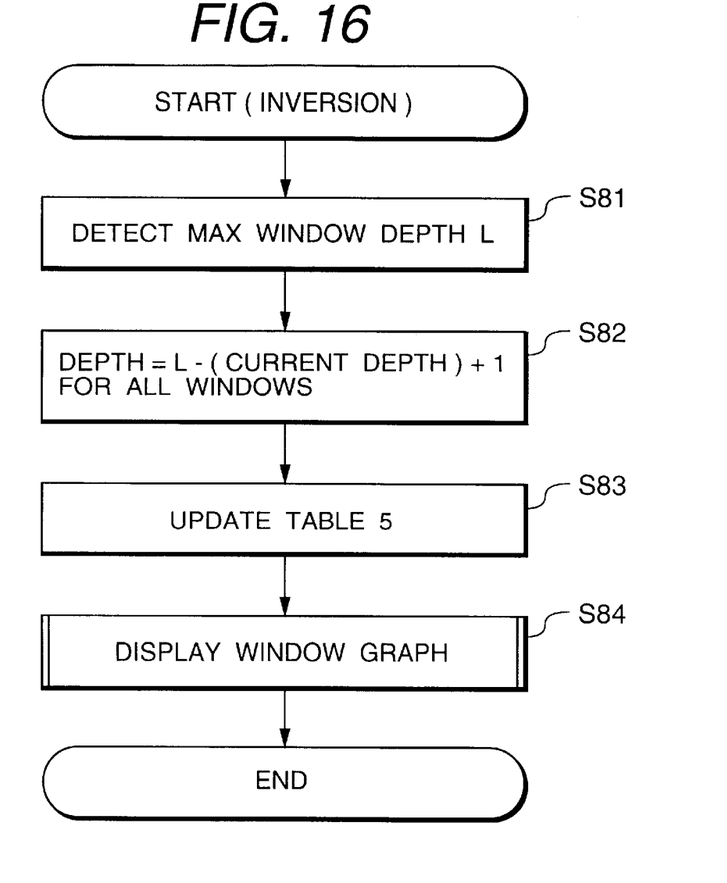
FIG. 16 is a flowchart showing a procedure of window operations which are added to a control operation of the window system of the third embodiment to embody a window system of the fourth embodiment.

A control operation that is executed by the window system of the embodiment is also realized by adding processing steps shown in FIG. 16 as a window operation to the control operation of the third embodiment.

In FIG. 16, first in step S81, a maximum value (L) of the depths of the windows is detected. In step S82, differences between (L) and all of the windows are calculated, thereby arranging the depths of the windows in the reverse order. In step S83, the window management table 5 is updated. After that, the result of the arrangement in the reverse order is displayed in step S84.

Figure 17:
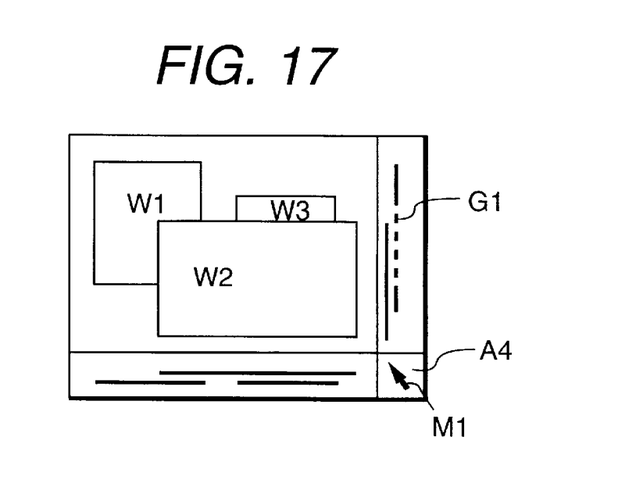
FIG. 17 is a diagram showing windows in FIG. 15 in accordance with the reverse order by the window system of the fourth embodiment.

The mouse cursor is moved to the area A4 at the right lower corner of the display 8 and the mouse button is clicked at this position. Thus, an overlapping state of the windows as shown in FIG. 15 changes as shown in FIG. 17. Such an operation is an operation to reverse the upper/lower relations among all of the windows.

According to the embodiment as described above, a display state easily becomes a state in which many hidden windows can be seen in a lump, so that a target window can be found out quickly. Moreover, there is an effect such that by clicking the mouse button once again in the same area A4, the display state can be easily returned to the original arrangement state. In the case where the target window cannot be discriminated by only the size and position, the target window can be found out early for the windows in which the actual display contents have to be seen.

According to the invention as described above, the overlapping state of the windows is checked, the positional relations of the windows when they are seen from another direction different from the overlapping direction are formed as window graphs, and the window graphs formed are displayed. Therefore, the overlapped hidden window can be easily found out. The overlapping state of the windows can be easily grasped. Thus, there is an effect such that a working efficiency of the window processes can be improved.

Preferably, since the system has the detecting means for detecting the overlapped portions of the windows from the window graphs formed and the changing means for changing the attribute of the window graph in order to clarify the overlapped portion when the overlapped portion of the window graphs is detected by the detecting means, a confusion which occurs when grasping the overlapping state of the windows can be prevented.

The overlapping state of the windows is checked, the positional relations of the windows when they are seen from another direction different from the overlapping direction of the windows are formed as window graphs, the window graphs formed are displayed, and when the selection or operation is instructed to a desired window graph among the window graphs formed, the selecting instruction or operating instruction is performed to the relevant window. Therefore, the hidden window can be directly operated, the overlapping state or position of the windows can be easily changed, and the operating efficiency can be further improved.

What is claimed is:

1. A window displaying system comprising:

setting means for setting first and second display areas on a display screen;

window display means for displaying a plurality of windows in the first display area set by said setting means;

checking means for checking an overlapping state of the plurality of windows displayed by said window display means;

graph display means for, in response to a checking by said checking means, displaying a set of window graphs in the second display area set by said setting means, the set of window graphs showing the overlapping state of the plurality of windows displayed in the first display area;

detecting means for detecting an overlapped portion of the window graphs displayed by said graph display means; and changing means for changing a display condition of the window graphs in response to the overlapped portion of the window graphs detected by said detecting means.

2. A system according to claim 1, wherein said changing means changes a display condition of the overlapped portion of the window graphs by changing at least one of shape, color, flickering, texture, thickness, and shadow.

3. A system according to claim 1, wherein each of the window graphs is provided with a name of the window corresponding to the window graph.

4. A window displaying system comprising:

window display means for displaying a plurality of windows on a display screen;

checking means for checking an overlapping state of the plurality of windows displayed by said window display means;

forming means for forming window graphs each showing a positional relation of each window when the windows are seen from another direction different from an overlapping direction;

graph display means for displaying the window graphs formed by said forming means on the display screen;

designation means for designating one of the window graphs displayed by said graph display means, wherein each of the window graphs and the window corresponding to said each of the window graphs have a common color which is different from the colors of the other window graphs;

instruction input means for inputting an operating instruction; and control means for executing the operating instruction input by said instruction input means for one of the plurality of windows corresponding to the one window graph designated by said designation means.

5. A window displaying system according to claim 4, wherein the operating instruction is an instruction to move the window in the vertical or lateral direction.

6. A window displaying system according to claim 4, wherein the operating instruction is an instruction to change the overlapping state of the windows.

7. A window displaying system according to claim 4, wherein the operating instruction is an instruction to change a size of the window.

8. A window displaying system according to claim 4, wherein the operating instruction is an instruction to erase the window.

9. A window displaying system according to claim 4, wherein the operating instruction is performed for all of the windows.

10. A window displaying system according to claim 4, wherein each of the window graphs is provided with a name of the window corresponding to the window graph.

11. A window displaying system according to claim 4, wherein said graph display means displays the graphs in both vertical and horizontal directions.

12. A window displaying system according to claim 4, wherein the windows are controlled by coordinates.

13. A window displaying system according to claim 4, wherein the color of the window is the color of a frame of the window.

14. A method comprising:

a setting step for setting first and second display areas on a display screen;

a window display step for displaying a plurality of windows in the first display area set in said setting step;

a checking step for checking an overlapping state of the plurality of windows displayed in said window display step;

a graph display step for, in response to a checking in said checking step, displaying a set of window graphs in the second display area set in said setting step, each set of window graphs showing the overlapping state of the plurality of windows displayed in the first display area;

detecting an overlapped portion of the window graphs displayed; and changing a display condition of the window graphs in response to the overlapped portion of the window graphs detected.

15. A method according to claim 14, wherein said changing step changes a display condition of the overlapped portion of the window graphs by changing at least one of shape, color, flickering, texture, thickness, and shadow.

16. A method according to claim 14, wherein each of the window graphs is provided with a name of the window corresponding to the window graph.

17. A method comprising:

a window display step for displaying a plurality of windows on a display screen;

a checking step for checking an overlapping state of the plurality of windows displayed in said window display step;

a forming step for forming window graphs each showing a positional relation of each window when the windows are seen from another direction different from an overlapping direction;

a graph display step for displaying the window graphs formed in said forming step on the display screen wherein each of the window graphs and the window corresponding to said each of the window graphs have a common color which is different from the colors of the other window graphs;

a designation step for designating one of the window graphs displayed in said graph display step;

an instruction input step for inputting an operating instruction; and a control step for executing the operating instruction input in said instruction input step for one of the plurality of windows corresponding to the one window graph designated in said designation step.

18. A method according to claim 17, wherein the operating instruction is an instruction to move the window in the vertical or lateral direction.

19. A method according to claim 17, wherein the operating instruction is an instruction to change the overlapping state of the windows.

20. A method according to claim 17, wherein the operating instruction is an instruction to change a size of the window.

21. A method according to claim 17, wherein the operating instruction is an instruction to erase the window.

22. A method according to claim 17, wherein the operating instruction is performed for all of the windows.

23. A method according to claim 17, wherein each of the window graphs is provided with a name of the window corresponding to the window graph.

24. A method according to claim 17, wherein said graph display means displays the graphs in both vertical and horizontal directions.

25. A method according to claim 17, wherein the windows are controlled by coordinates.

26. A memory medium system according to claim 30, wherein the color of the window is the color of a frame of the window.

27. A memory medium for storing a control program for effecting a method, the method comprising the steps of:

a setting step for setting first and second display areas on a display screen;

a window display step for displaying a plurality of windows in the first display area set in said setting step;

a checking step for checking an overlapping state of the plurality of windows displayed in said window display step;

a graph display step for, in response to a checking in said checking step, displaying a set of window graphs in the second display area set by said setting step, the set of window graphs showing the overlapping state of the plurality of windows displayed in the first display area;

detecting an overlapped portion of the window graphs displayed; and changing means for changing a display condition of the window graphs in response to the overlapped portion of the window graphs detected by said detecting means.

28. A medium according to claim 27, wherein said changing step changes a display condition of the window graphs by changing at least one of shape, color, flickering, texture, thickness, and shadow.

29. A medium according to claim 27, wherein each of the window graphs is provided with a name of the window corresponding to the window graph.

30. A memory medium for storing a control program for effecting a method, the method comprising the steps of:

a window display step for displaying a plurality of windows on a display screen;

a checking step for checking an overlapping state of the plurality of windows displayed in said window display step;

a forming step for forming window graphs each showing a positional relation of each window when the windows are seen from another direction different from an overlapping direction;

a graph display step for displaying the window graphs formed in said forming step on the display screen, wherein each of the window and the window corresponding to said each of the window graphs have a common color which is different from the colors of the other window graphs;

a designation step for designating one of the window graphs displayed in said graph display step;

an instruction input step for inputting an operating instruction; and a control step for executing the operating instruction input in said instruction input step for one of the plurality of windows corresponding to the one window graph designated in said designation step.

31. A medium according to claim 30, wherein the operating instruction is an instruction to move the window in the vertical or lateral direction.

32. A medium according to claim 20, wherein the operating instruction is an instruction to change the overlapping state of the windows.

33. A medium according to claim 20, wherein the operating instruction is an instruction to change a size of the window.

34. A medium according to claim 20, wherein the operating instruction is an instruction to erase the window.

35. A medium according to claim 20, wherein the operating instruction is performed for all of the windows.

36. A medium according to claim 20, wherein each of the window graphs is provided with a name of the window corresponding to the window graph.

37. A method according to claim 30, wherein said graph display means displays the graphs in both vertical and horizontal directions.

38. A method according to claim 30, wherein the windows are controlled by coordinates.

39. A memory medium system according to claim 30, wherein the color of the window is the color of a frame of the window.

40. A window displaying system comprising:

a setting means for setting first and second display areas on a display screen;

a window display step for displaying a plurality of windows in the first display area set by said setting means;

a checking means for checking an overlapping state of the plurality of windows displayed by said window display means; and graph display means for, in response to a checking by said checking means, displaying a set of window graphs in the second display area set by said setting means, the set of window graphs showing the overlapping state of the plurality of windows displayed in the first display area, wherein each of the window graphs and the window corresponding to said each of the window graphs have a common color which is different from the colors of the other window graphs.

41. A window displaying system according to claim 40, wherein said graph display means displays the graphs in both vertical and horizontal directions.

42. A window displaying system according to claim 40, wherein the windows are controlled by coordinates.

43. A window displaying system according to claim 40, wherein the color of the window is the color of a frame of the window.

* * * * *

UNITED STATES PATENT AND TRADEMARK OFFICE
CERTIFICATE OF CORRECTION

PATENT NO. : 6,163,318
DATED : December 19, 2000
INVENTOR(S) : Ryoji Fukuda et al.

It is certified that error appears in the above-identified patent and that said Letters Patent is hereby corrected as shown below:

Title page,
Item [56] References Cited,

FOREIGN PATENT DOCUMENTS,

| "2301821 | | -- 2-301821 |
| 5080965 | should | 5-080965 |
| 05173743 | read | 5-173743 |
| 5204581" | | 5-204581 |

Sheet 3,
FIG. 5,

" | X1 | Y2 | " should read -- | X2 | Y2 | --.

Column 11,
Line 34, "memory medium system according to claim 30," should read -- method according to claim 17, --.
Line 57, "condition" should read -- condition of the overlapped portion --.

Column 12,
Line 11, "window" (first occurrence) should read -- window graphs --.
Line 24, "A" should read -- A memory --.
Line 27, "A" should read -- A memory --, and "claim 20," should read -- claim 30, --.
Line 30, "A" should read -- A memory --, and "claim 20," should read -- claim 30, --.
Line 33, "A" should read -- A memory --, and "claim 20," should read -- claim 30, --.
Line 35, "A" should read -- A memory --, and "claim 20," should read -- claim 30, --.
Line 37, "A" should read -- A memory --, and "claim 20," should read -- claim 30, --.
Line 40, "method" should read -- memory medium --.

UNITED STATES PATENT AND TRADEMARK OFFICE
CERTIFICATE OF CORRECTION

PATENT NO. : 6,163,318
DATED : December 19, 2000
INVENTOR(S) : Ryoji Fukuda et al.

It is certified that error appears in the above-identified patent and that said Letters Patent is hereby corrected as shown below:

Column 12,
Line 44, "method" should read -- memory medium --.
Line 52, "step" should read -- means --.

Signed and Sealed this

Twenty-ninth Day of January, 2002

Attest:

JAMES E. ROGAN
Attesting Officer
Director of the United States Patent and Trademark Office